United States Patent
Dudar

(10) Patent No.: US 10,883,450 B2
(45) Date of Patent: Jan. 5, 2021

(54) METHODS AND SYSTEMS FOR CLOUD-BASED EMISSIONS TESTING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/044,334

(22) Filed: Jul. 24, 2018

(65) Prior Publication Data

US 2020/0032746 A1 Jan. 30, 2020

(51) Int. Cl.
  *F02M 25/08* (2006.01)
  *G01M 15/10* (2006.01)
  *G01M 3/02* (2006.01)

(52) U.S. Cl.
  CPC ........ *F02M 25/0827* (2013.01); *G01M 3/025* (2013.01); *G01M 15/102* (2013.01)

(58) Field of Classification Search
  CPC . F02M 25/0827; G01M 15/102; G01M 3/025
  USPC ........................................................ 123/520
  See application file for complete search history.

(56) References Cited

U.S. PATENT DOCUMENTS

| | | | |
|---|---|---|---|
| 6,314,797 B1 | 11/2001 | Dawson et al. | |
| 8,849,503 B1 | 9/2014 | Dudar | |
| 9,926,875 B2 | 3/2018 | Dudar et al. | |
| 10,018,158 B2 | 7/2018 | Dudar | |
| 2011/0238259 A1* | 9/2011 | Bai | H04L 67/125 701/31.4 |
| 2014/0303806 A1 | 10/2014 | Bai et al. | |
| 2014/0345575 A1* | 11/2014 | Peters | F02M 25/0836 123/520 |
| 2016/0025588 A1 | 1/2016 | Dudar | |
| 2016/0025589 A1 | 1/2016 | Tseng et al. | |
| 2016/0140842 A1 | 5/2016 | Park et al. | |
| 2017/0067414 A1* | 3/2017 | Dudar | F02M 25/0809 |
| 2018/0176930 A1* | 6/2018 | Welsch | H04W 72/1205 |

OTHER PUBLICATIONS

Dudar, A. et al., "Systems and Methods for Fuel Tank Diagnostics," U.S. Appl. No. 15/728,884, filed Oct. 10, 2017, 89 pages.

* cited by examiner

*Primary Examiner* — Joseph J Dallo
*Assistant Examiner* — Scott A Reinbold
(74) *Attorney, Agent, or Firm* — Geoffrey Brumbaugh; McCoy Russell LLP

(57) ABSTRACT

Methods and systems are provided for an evaporative emissions system diagnostic. In one example, a method may include adjusting a controller operation in response to a fuel tank volume. A vehicle may determine sunrise and sunset times via a wireless modem and may relay the sunrise and sunset times to other vehicles within a threshold distance.

18 Claims, 8 Drawing Sheets

METHODS AND SYSTEMS FOR CLOUD-BASED EMISSIONS TESTING

FIELD

The present description relates generally to monitoring a vehicle fuel system and evaporative emissions control system for the presence of undesired evaporative emissions.

BACKGROUND/SUMMARY

Vehicle evaporative emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired evaporative emissions that could release fuel vapors to the atmosphere.

Undesired evaporative emissions may be identified using engine-off natural vacuum (EONV) during conditions when a vehicle engine is not operating. In particular, a fuel system and evaporative emissions control system may be isolated at an engine-off event. The pressure in such a fuel system and evaporative emissions control system may increase if the tank is heated further (e.g., from hot exhaust or a hot parking surface or hot ambient temperatures) as liquid fuel vaporizes. If the pressure rise meets or exceeds a predetermined threshold, it may be indicated that the fuel system and the evaporative emissions control system may be free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation is monitored and undesired emissions identified based on expected vacuum development or expected rates of vacuum development.

However, the EONV test may be prone to false failures based on customer driving and parking habits. For example, a refueling event that fills the fuel tank with relatively cool liquid fuel followed by a short ensuing trip may fail to heat the fuel bulk mass and may result in a false fail if an EONV test is run on a subsequent engine off. Further, the rates of pressure build and vacuum development are based in part on the ambient temperature. During mild weather conditions, the ambient temperature may restrict the amount of heating or cooling of the fuel tank following engine shut-off, and thus limit the rate of pressure or vacuum development. As such, in a case wherein a pressure build does not reach the expected threshold, the subsequent vacuum build may additionally not reach expected threshold level in the time allotted for the EONV test based on available battery charge. This may result in a false-fail condition, leading to potentially unnecessary engine service. The inventors herein have recognized these disadvantages.

Other attempts to address EONV hardships include one example approach shown by Dawson et al. in U.S. Pat. No. 6,314,797, which teaches sealing an evaporative emissions control system at a key-off event and monitoring a vacuum switch coupled to the evaporative emissions control system for a closing event due to a natural vacuum created in the evaporative emissions control system as it cools. If a closing event is not detected, it may be determined whether a timer has exceeded a predetermined threshold value, and if so, the presence of undesired evaporative emissions may be indicated. In one example, it is taught that diurnal temperature cycling may result in the formation of a vacuum-build in the sealed fuel system and evaporative emissions control system, and if the vacuum switch is closed under such conditions, then it may be indicated that the fuel system and evaporative emissions control system are free from undesired evaporative emissions.

However, the inventors herein have recognized potential issues with such systems. As one example, a vehicle which is primarily driven at night, and which is thus primarily parked during the day, may only experience heat gains during times when the vehicle is in a prolonged key-off condition, and thus the vacuum switch may not close. In such an example of vehicle operation, in-use monitoring performance (IUMP) rates may be significantly impacted. Furthermore, the use of a vacuum switch may demand an application specific integrated circuit (ASIC) chip to be alive at all times in a low power mode to sense that the vacuum switch is closed from a diurnal cycle cool down. The use of such a chip can affect the main battery drain. Thus, to decrease parasitic drain on the battery, it may be desired to wake a controller at opportune times for conducting an evaporative emissions test diagnostic procedure, where opportune times may comprise portions of the diurnal cycle where heat gains and losses are greatest.

While other current methods have partially addressed these issues via onboard solar cells configured to determine changes in ambient light, thereby determining when larger temperature changes may occur, there methods are not without shortcomings. Primarily, solar cells may be expensive and increase a manufacturing cost. Additionally, vehicles parked in dark areas, such as in a parking garage, may experience ambient temperature changes while be occluded from ambient light. Furthermore, parasitic losses from waking the controller and maintaining the controller awake during the EONV test independent of vehicle conditions may unnecessarily drain the battery.

Thus, the inventors herein have developed systems and methods to at least partially address the above issues. In one example, alternating a controller between wake and sleep during an emission test in response to a fuel tank volume during a sunrise or a sunset. In this way, a battery state of charge (SOC) may be preserved during the EONV test when it may take a long time for the fuel tank pressure to reach the predetermined pressure.

In one example, the emission test is a pressure test to determine if an undesired leak is present in a fuel system. Thus, if it may take longer than a threshold duration for a fuel pressure to increase or decrease to a predetermined pressure, then the controller may be alternated between wake and sleep conditions.

In some examples, a system comprising a plurality of vehicles, wherein at least one vehicle of the vehicle comprises one or more of a wireless modem or a dedicated-short-range-communication (DSCR) network and a solar cell and a controller with computer-readable instructions stored on non-transitory memory thereof that when executed enable the controller to retrieve times for a sunrise and a sunset for the at least one vehicle, relay times from the at least one vehicle to other vehicles of the plurality of vehicles, and execute an emission test during the sunrise or the sunset. By doing this, manufacturing costs may decrease as each vehicle may not comprise a wireless modem and/or a solar cell. The DSRC network may allow the plurality of vehicles to communicate with one another and relay at least sunrise and sunset times to one another.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
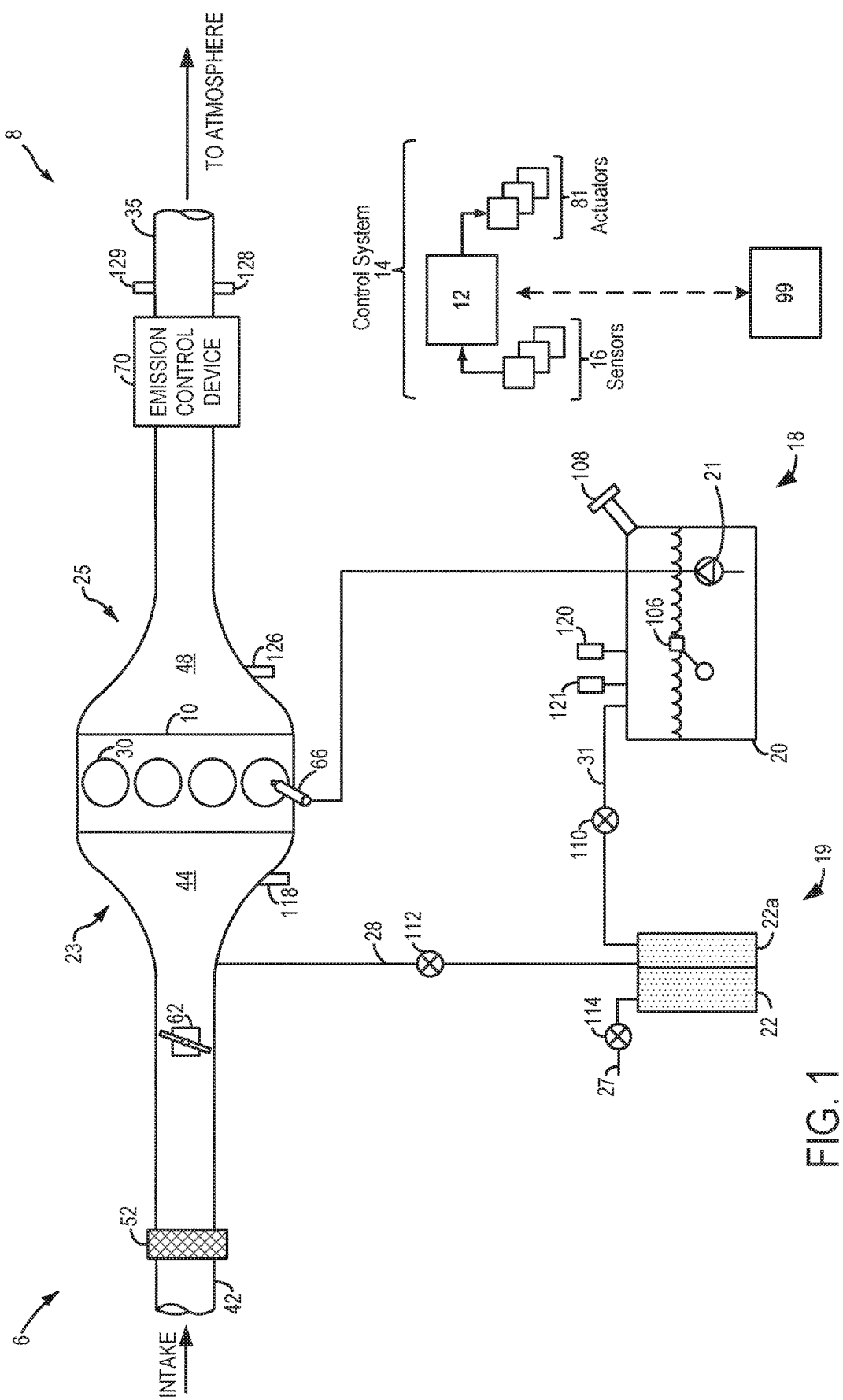
FIG. 1 shows a schematic depiction of a fuel system and an evaporative emissions control system coupled to an engine system of a hybrid vehicle.
Figure 2:
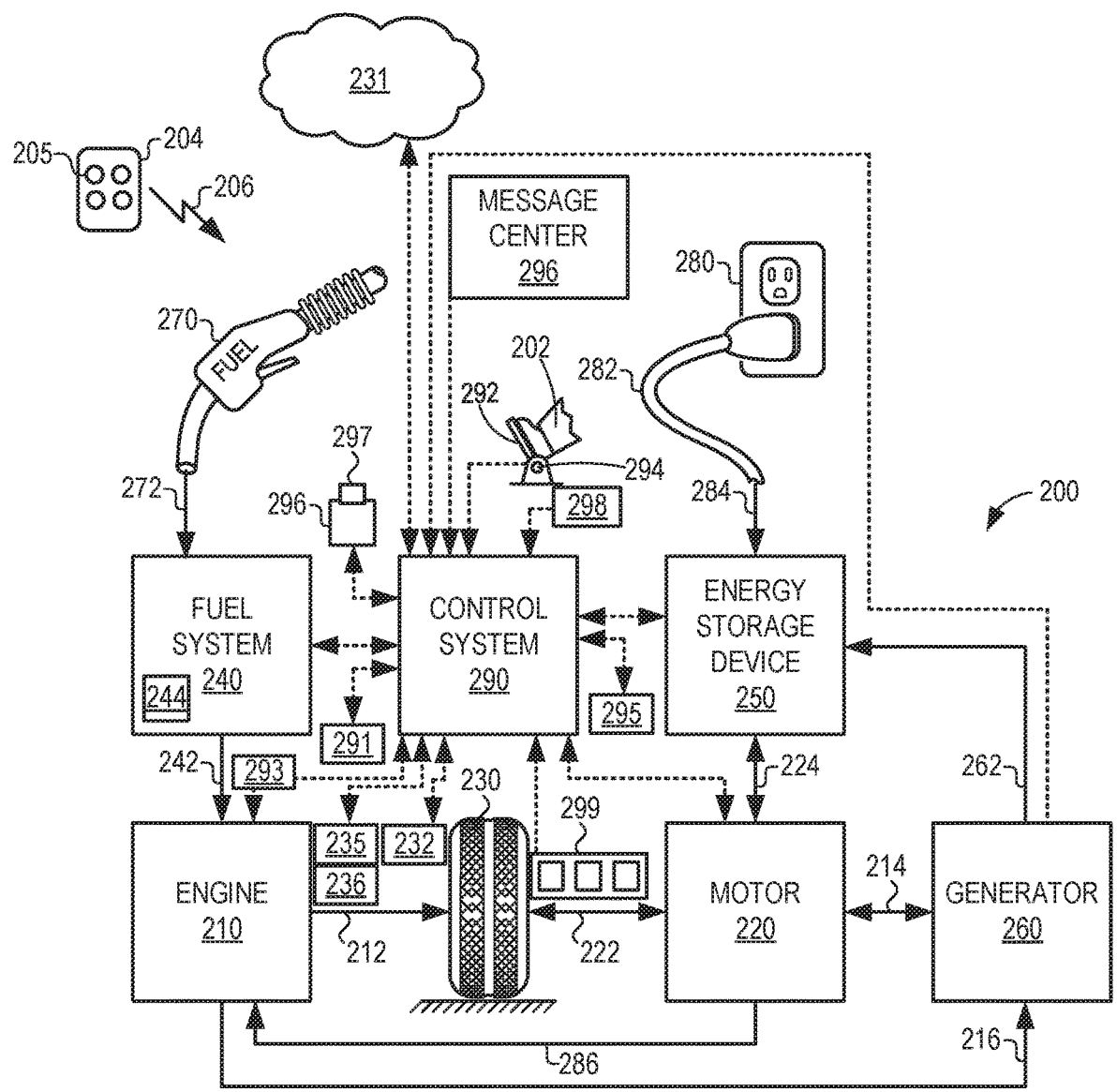
FIG. 2 schematically shows an example vehicle propulsion system.
Figure 3:
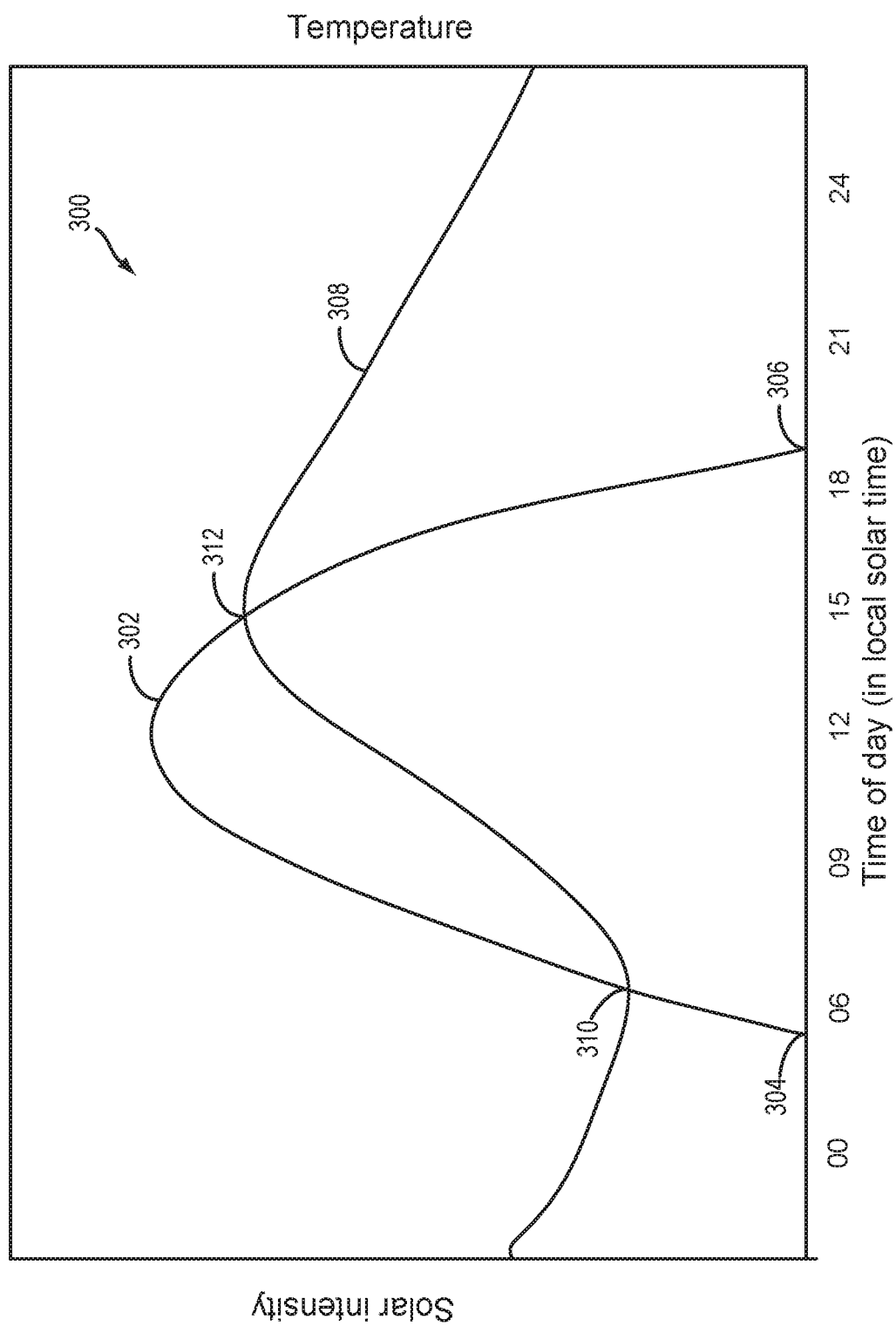
FIG. 3 shows a diurnal cycle as a graph of solar intensity and temperature as a function of the time of day.
Figure 4:
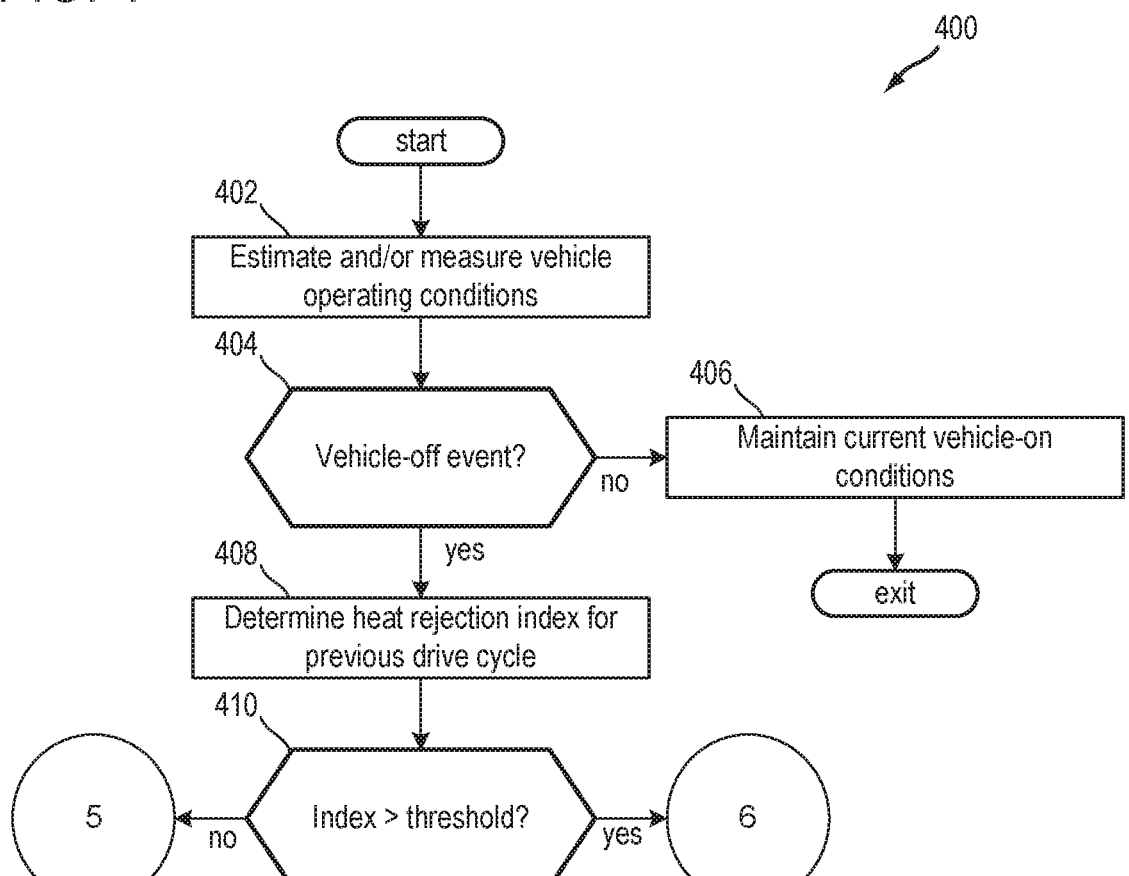
FIG. 4 shows a method for determining whether to conduct an engine-off natural vacuum (EONV) test on a vehicle fuel system and evaporative emissions control system.
Figure 5:
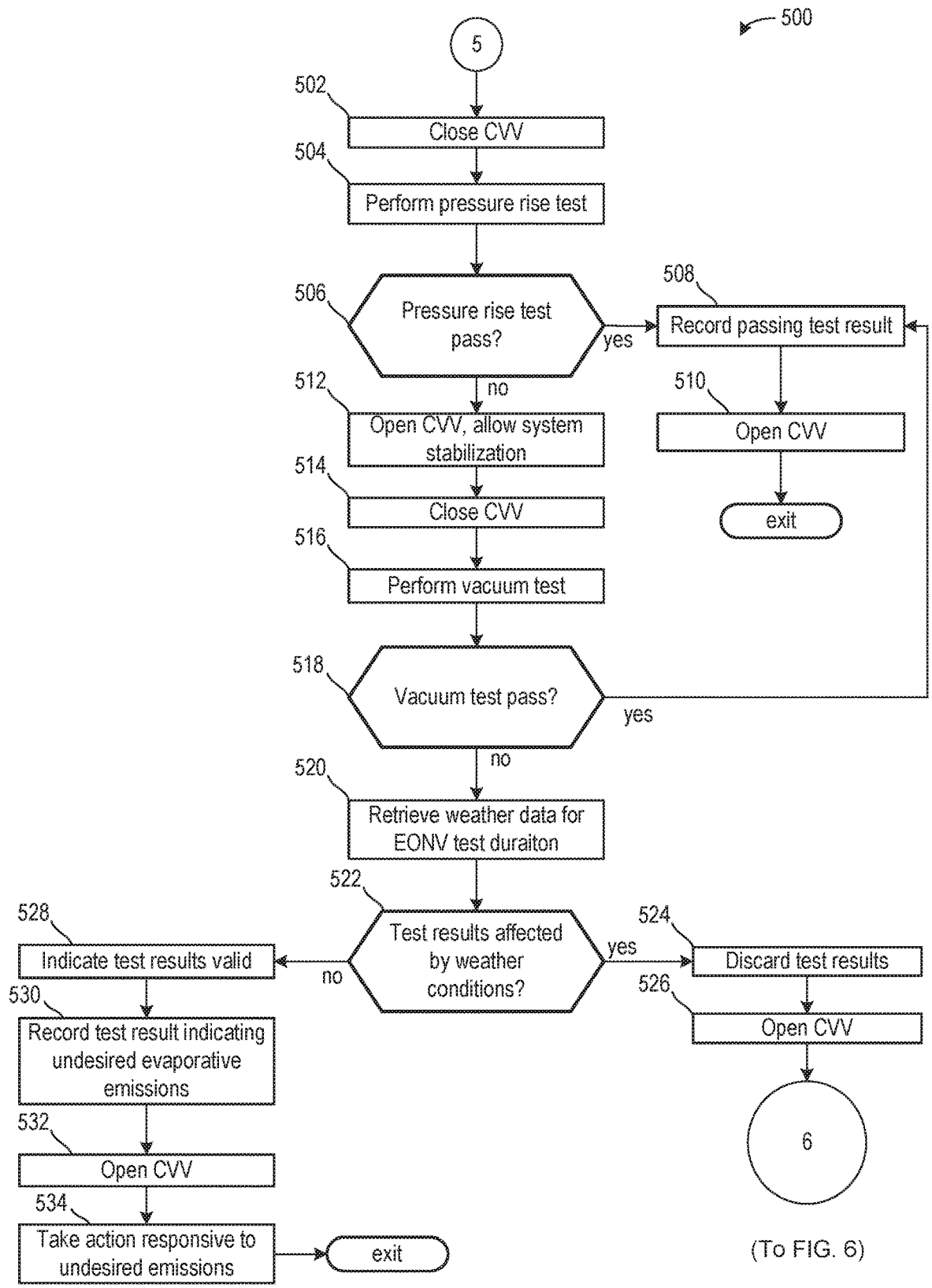
FIG. 5 shows a method for conducting an engine-off natural vacuum (EONV) test.
Figure 6:
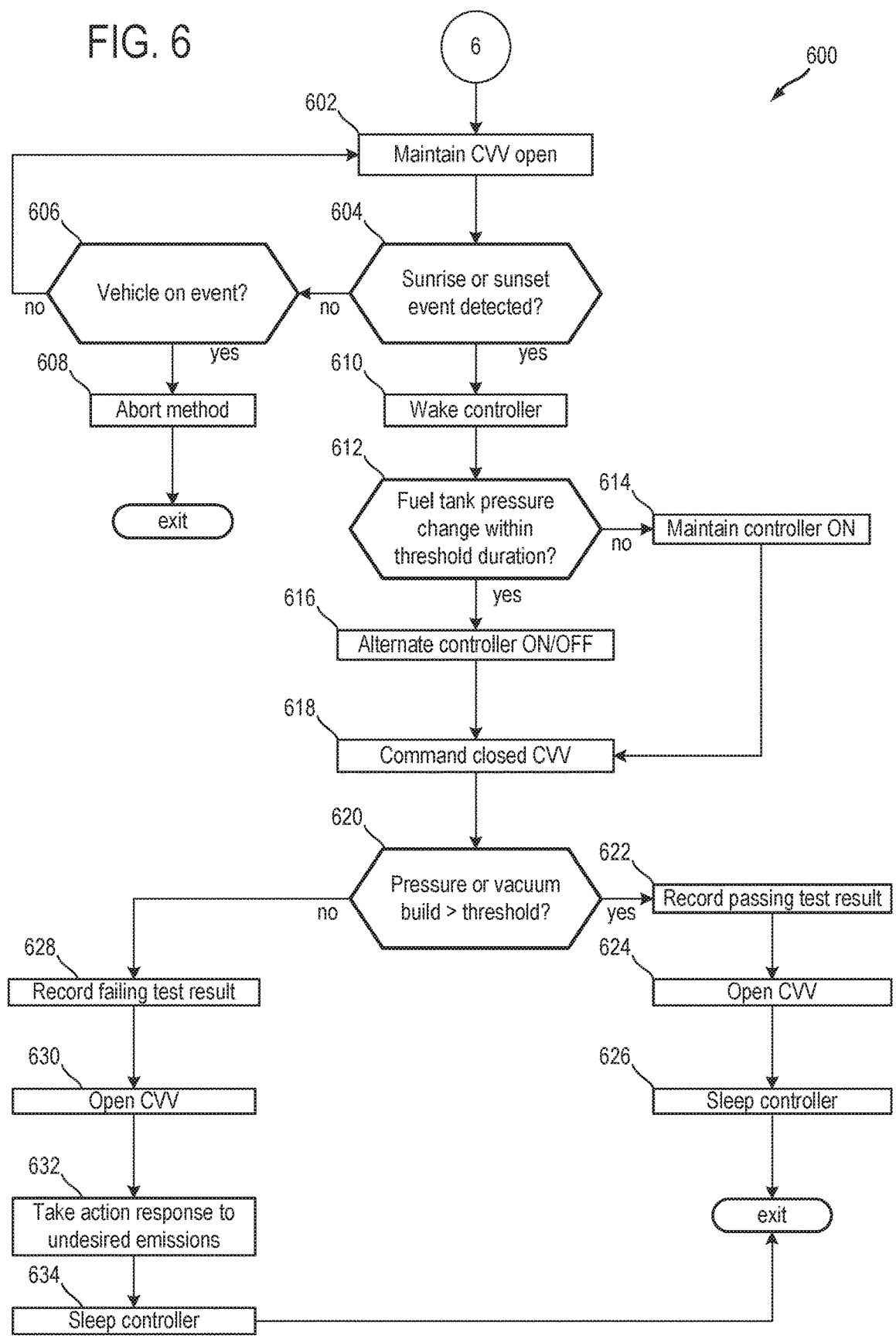
FIG. 6 shows a method for conducting an evaporative emissions test diagnostic based on a sunrise or a sunset.
Figure 7:
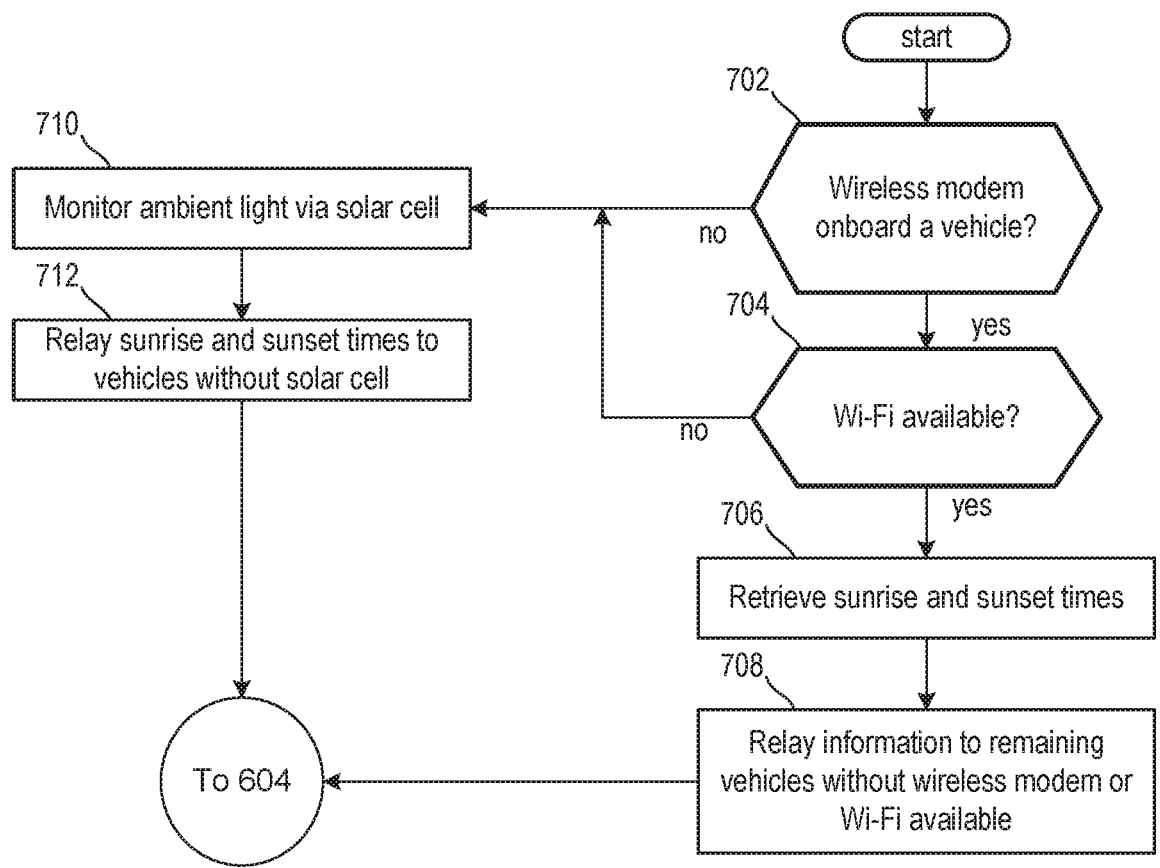
FIG. 7 shows a method for determining when the sunrise and the sunset may occur.
Figure 8:
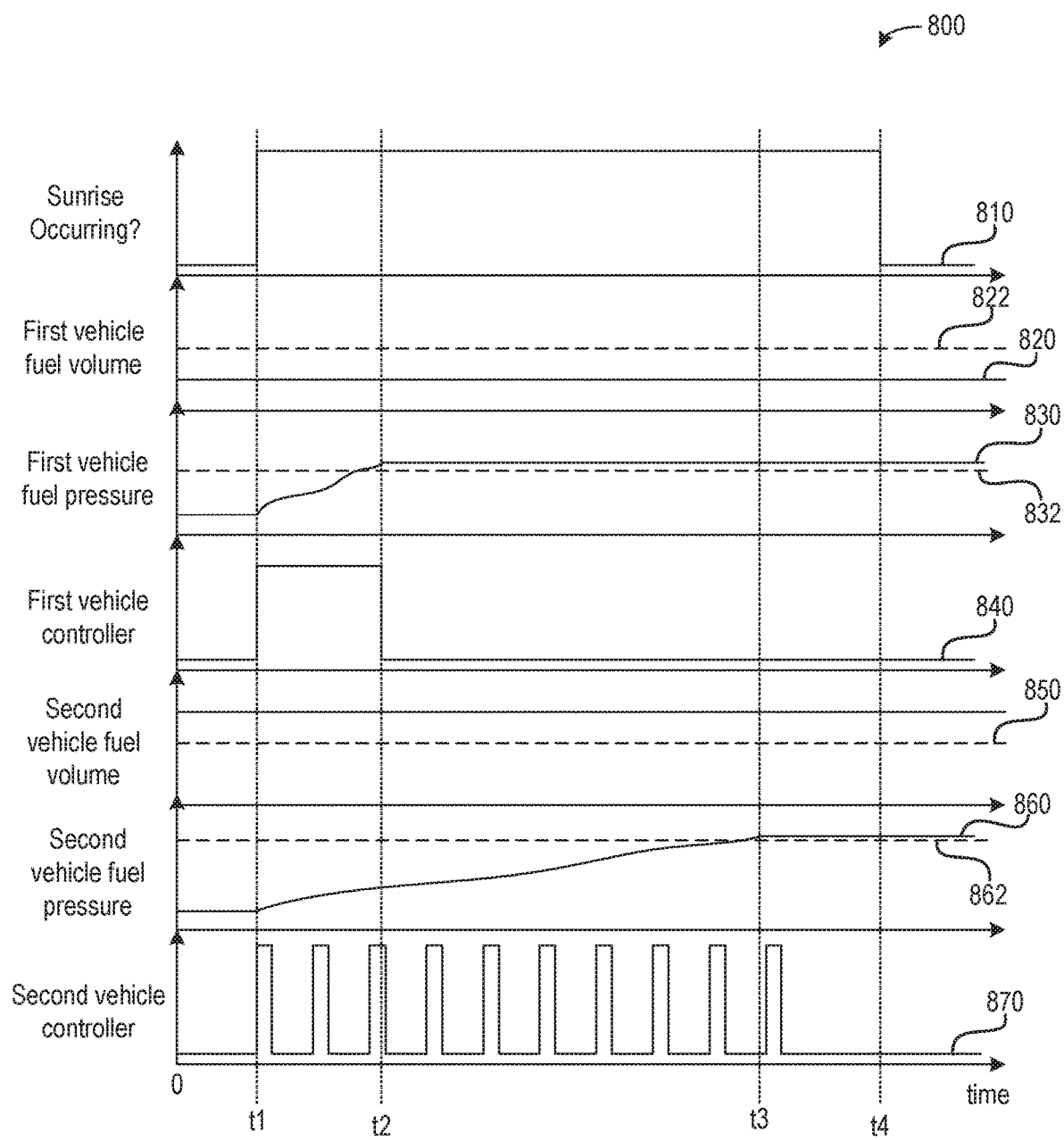
FIG. 8 shows an engine operating sequence illustrating one or more vehicle conditions based on the hybrid vehicle of FIGS. 1 and 2 executing the method of FIG. 7.

The following description relates to systems and methods for retrieving information related to sunrise and sunset start times and executing an emissions tests based on one or more vehicle operating parameters. FIG. 1 shows an example of a hybrid vehicle comprising a fuel system and an evaporative emissions control system. FIG. 2 shows one or more sensors of a vehicle propulsion system of the hybrid vehicle. FIG. 3 shows a diurnal cycle as a graph of solar intensity and temperature as a function of the time of day. FIG. 4 shows a method for determining if an emissions test may be executed based on a sufficient amount of engine heat rejection occurring during a previous drive cycle or if ambient temperature changes may be utilized. FIG. 5 shows a method for executing the emissions test as an EONV test due to sufficient heat rejection occurring during a previous drive cycle. FIG. 6 shows a method for executing the emissions test during a sunrise or sunset, where the emissions test may measure a pressure increase during a sunrise or a pressure decrease (e.g., vacuum) during a sunset. FIG. 7 shows a method for determining when the sunrise and sunset will occur. FIG. 8 shows an engine operating sequence illustrating one or more vehicle conditions based on the hybrid vehicle of FIGS. 1 and 2 executing the method of FIG. 7.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device, such as a battery system shown in FIG. 2. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve (CVV) 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system (and evaporative emissions system) pressure. In one example, the fuel system pressure, and in some example evaporative emissions system pressure as well, is indicated by pressure sensor 120, where pressure sensor 120 is a fuel tank pressure transducer (FTPT) coupled to fuel tank 20. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve (CPV) 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be desired if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

While the above descriptions depict examples where a fuel tank isolation valve is included in the vehicle system, in other examples a fuel tank isolation valve may not be included without departing from the scope of this disclosure.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory. For example, control system 14 may be communicatively coupled to an off-board computing system 99 such as a network or cloud computing system via wireless communication, which may be Wi-Fi, Bluetooth, a type of cellular service, or a wireless data transfer protocol. As such, this connectivity where the vehicle data is uploaded, also referred to as the "cloud", may be a commercial server or a private server where the data is stored and then acted upon by optimization algorithms. The algorithm may process data from a single vehicle, a fleet of vehicles, a family of engines, a family of powertrains, or a combination thereof. The algorithms may further take into account the system limitations, produce calibration data for optimizing powertrain outputs, and send them back to the vehicle(s) where they are applied. Off-board computing system 99 may store or provide access to data that may be downloaded to control system 14 for processing by controller 12.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIGS. 4-7.

Controller 12 may also be configured to intermittently perform evaporative emissions detection routines on fuel system 18 and evaporative emissions system 19 to confirm that the fuel system and/or evaporative emissions system is not degraded. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum (EONV) test. In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may monitor undesired emissions based on expected vacuum development or expected rates of vacuum development. The EONV test may be monitored for a period of time based on available battery charge.

However, as described above and which will be described in further detail below, in some examples heat rejection from the engine during a previous drive cycle may not be sufficient for conducting an EONV test. In addition, rates of pressure build and vacuum development can be affected by ambient temperature and other weather conditions. As such, if the EONV test is run under sub-optimal conditions, then the presence of undesired evaporative emissions may be falsely indicated. In another approach, diurnal temperature changes may result in a pressure or vacuum build in a sealed fuel system and evaporative emissions control system, such that the presence or absence of undesired evaporative emissions may be indicated. As described below, one advantageous time for waking a vehicle controller to seal the fuel system and evaporative emissions control system for conducting an evaporative emissions test diagnostic include sunrise and sunset events.

FIG. 2 illustrates an example vehicle propulsion system 200 which may be used similarly to hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold range (e.g., 5,000 feet) to communicate (e.g., transfer information) free of an internet connection.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example.

In some examples, vehicle propulsion system 200 may further include one or more solar cells 291 arranged on an exterior of the vehicle. The solar cells 291 may provide feedback regarding an amount of ambient light. Solar cells 291 may in some examples be utilized to determine when a sunrise or a sunset is occurring the absence of an available internet connection.

In one example, a sunrise may include from a time (e.g., clock time for a given day of the week) at which the sun is first visible on the horizon at a location on the earth where the vehicle is positioned at that time to a time at which the sun is fully visible. Similarly, a sunset may include a time (e.g., clock time for a given day of the week) at which the sun is last fully visible on the horizon at a location on the earth where the vehicle is positioned at that time to the first time at which it is no longer visible. A sunrise/sunset event may be detected by determining whether the current clock time is at a predicted sunrise or sunset time received from weather broadcast information, internet weather data, etc. Further, the sunrise/sunset time may be determined from real-time sensing of solar cell output or other light sensor output coupled in the vehicle becoming above/below, respective thresholds.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIGS. 4-7.

Controller 12 may also be configured to intermittently perform evaporative emissions detection routines on fuel system 18 and evaporative emissions system 19 to confirm that the fuel system and/or evaporative emissions system is not degraded. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may expose undesired emissions based on expected vacuum development or expected rates of vacuum development. The EONV test may be monitored for a period of time based on available battery charge.

However, as described above and which will be described in further detail below, in some examples heat rejection from the engine during a previous drive cycle may not be sufficient for conducting an EONV test. In addition, rates of pressure build and vacuum development can be affected by ambient temperature and other weather conditions. As such, if the EONV test is run under sub-optimal conditions, then the presence of undesired evaporative emissions may be falsely indicated. In another approach, diurnal temperature changes may result in a pressure or vacuum build in a sealed fuel system and evaporative emissions control system, such that the presence or absence of undesired evaporative emissions may be indicated. As described below, a desired time for waking a vehicle controller to seal the fuel system and evaporative emissions control system for conducting an evaporative emissions test diagnostic may include sunrise and sunset events due to their relatively high temperature changes compared to other times of the day.

Turning now to FIG. 3, an example illustration of a diurnal cycle 300 as a graph of solar intensity and temperature as a function of the time of day, is shown. Incoming solar radiation 302 begins increasing at sunrise 304, and rises to a maximum near mid-day before declining until sunset 306. As such, sunrise 304 marks a time of day near where a heat gain cycle is at its greatest, and sunset 306 marks a time of day near where a heat loss cycle is at its greatest. Accordingly, ambient temperature 308 is shown, illustrating the increase in temperature from a minimum temperature 310 near sunrise 304, and the decrease in temperature from a maximum temperature 312 near sunset 306. As such, both sunrise 304 and sunset 306 mark timepoints during a diurnal cycle 300, where sealing a fuel system and/or an evaporative emissions system may result in the greatest increases (e.g., at sunrise) or decreases (e.g., at sunset) in pressure in the fuel system and evaporative emissions system. As will be described in further detail below, a method that is able to sense sunrise 304 and sunset 306 events thus represents an effective way to initiate evaporative emissions test diagnostics at timepoints during the day where opportunities for robust results from such a test are greatest. Furthermore, as will be discussed further below, the use of a solar cell to sense sunrise or sunset events may enable a controller to be awoken only at opportune times for conducting an evaporative emissions test diagnostic, thus eliminating a condition to keep electronics alive during times where such electronics are not being utilized.

Turning now to FIG. 4, a flow chart for a high level example method 400 for determining whether to conduct an engine-off natural vacuum (EONV) test on a vehicle fuel system and evaporative emissions control system, is shown. More specifically, method 400 may be used to indicate a heat rejection index for a previous drive cycle responsive to an engine-off event. If the index is indicated to be greater than a threshold, method 400 may proceed with an engine-off natural vacuum test, whereas if the index is less than a threshold, method 400 may proceed with conducting an evaporative emissions test diagnostic based on received times for when a sunrise or a sunset may occur. Method 400 will be described with reference to the systems described herein and shown in FIG. 1 and FIG. 2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as canister purge valve (e.g., 112) and canister vent valve (e.g., 114), according to the method below.

Method 400 begins at 402 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 404, method 400 may include determining whether a vehicle-off event has occurred. The vehicle-off event may include a key-off event. The vehicle-off event may follow a vehicle run time duration, the vehicle run time duration commencing at a previous vehicle-on event. If no vehicle-off event is detected, method 500 may proceed to 406 which may include maintaining current vehicle-on conditions. For example, if the vehicle is being propelled via energy derived from a combustion engine, then such engine operating conditions may be maintained. Alternatively, if the vehicle is being propelled via energy derived via an onboard energy storage device such as a battery, such vehicle operating conditions may be maintained. Furthermore, valves may be maintained in their current state. For example, a canister purge valve (e.g., 112) may be maintained in an open conformation if open, for example if a purging event is in progress, or may be maintained closed if already closed. Furthermore, a canister vent valve (e.g., 114) may be maintained open if open, during vehicle operation. There may be some cases where the canister vent valve is closed during engine operation, such as an example condition where a vehicle-on evaporative emissions test is underway, and if the canister vent valve is indicated to be closed, it may be maintained closed at 406. At 406, method 400 may further include recording that a vehicle-off evaporative emissions test diagnostic procedure was not executed, and further may include setting a flag to retry an evaporative emissions test procedure at the next detected vehicle-off event. Method 400 may then end.

Returning to 404, if a vehicle-off event is indicated, method 400 may proceed to 408. At 408, method 400 may include determining a heat rejection index (HRI) for the previous drive cycle. In some examples, the heat rejection index may be based on a drive cycle aggressiveness index. The drive cycle aggressiveness index may be based on an amount of heat rejected by the engine during the previous drive cycle, the timing of the heat rejected, the length of time spent at differing levels of drive aggressiveness, ambient conditions, etc. The heat rejected by the engine may be based on one or more of engine load, fuel injected summed over time, and/or intake manifold air mass summed over time, miles driven, etc. Additionally or alternatively, the HRI may be further based on a hybrid operation of the vehicle. For example, as battery SOC decreases during a previous drive cycle, the HRI may proportionally decrease as well. That is to say, less heat may be rejected from the engine as more energy is consumed to propel the vehicle. Following determining the heat rejection index at 408, method 400 may proceed to 410.

At 410, method 400 includes determining an HRI threshold. In one example, a 3D lookup table stored at the vehicle controller may be used to adjust the HRI threshold based on the level of fuel in the fuel tank and the ambient temperature. The HRI threshold may thus represent a value for which an executed engine-off natural vacuum (EONV) test is likely to provide robust results. For example, based on the heat rejection index threshold, it may be inferred whether a pressure increase in the fuel system and evaporative emissions system would be below an expected pressure threshold level if the fuel system and evaporative emissions system were sealed following an engine-off event. For example, the HRI threshold may comprise an amount of air mass summation (lbs.) over a previous drive cycle, the air mass summation amount based on an indicated ambient temperature, and an indicated fuel level. As such, for a given ambient temperature (° F.), the HRI threshold may comprise a greater amount of air mass summation during a previous drive cycle for a fuel tank with a high fill level, and a lower amount of air mass summation for a fuel tank with a low fill level. Note that the above example of indicating an HRI threshold is one illustrative example, and is not meant to be limiting. For example, the HRI threshold may alternatively comprise a predetermined threshold, such as a number of miles driven, an amount of fuel injected summed over time, air mass summation over time, etc. Additionally or alternatively, any combination of engine load, fuel injected summed over time, air mass summation, miles driven, fuel level, ambient temperature, etc., that may indicate an amount of heat rejected to the 400 over time, may be utilized to determine the HRI threshold. Accordingly, at 410, method 500 includes indicating whether the HRI is greater than or equal to the threshold value. If the HRI is greater than or equal to the threshold, method 400 may proceed to method 500 depicted in FIG. 5, which may include conducting an EONV test, as will be described in further detail below. Alternatively, if the HRI is indicated to be less than the threshold, method 400 may proceed to method 600 depicted in FIG. 6, which may include conducting a vehicle-off evaporative emissions test diagnostic procedure based on an ambient light amount, as discussed in further detail below.

Turning now to FIG. 5, a flow chart for a high-level example method 500 for conducting an engine-off natural vacuum (EONV) test is shown. More specifically, method 500 proceeds from method 400, and includes conducting an EONV test responsive to an indication (from method 400) that an indicated heat rejection index from a previous drive cycle is greater than a threshold. Conducting the EONV test may include sealing a vehicle fuel system and evaporative emissions control system from atmosphere, monitoring a pressure increase in the fuel system and evaporative emissions control system, and indicating an absence of undesired evaporative emissions responsive to the pressure increase above a predetermined pressure-build threshold; and responsive to the pressure increase below the predetermined pressure-build threshold, unsealing the fuel system and evaporative emissions system to allow pressure in the fuel system and evaporative emissions control system to return to atmospheric pressure, resealing the fuel system and evaporative emissions control system; and indicating an absence of undesired evaporative emissions responsive to development of a vacuum-build greater than a predetermined vacuum-build threshold.

Method 500 begins at 502 and may include closing a canister vent valve. If included, a fuel tank isolation valve may be commanded open to couple the fuel system to the evaporative emissions system such that changes in fuel tank pressure may be communicated to the evaporative emissions control system. However, a fuel tank isolation valve may not be included, and in such an example closing the CVV may thus seal the evaporative emissions control system and fuel system together. Furthermore, while not explicitly illustrated in method 500, the status of a canister purge valve may also be assessed and closed if open. Method 500 may then proceed to 504.

At 504, method 500 may include performing a pressure rise test. While the engine is still cooling down subsequent to a vehicle-off event, there may be additional heat rejected to the fuel tank, as discussed above with regard to method 400 depicted in FIG. 4. With the fuel system and evaporative emissions control system sealed via the closing of the CVV, pressure in the fuel tank may rise due to fuel volatizing with increased temperature. The pressure rise test may include monitoring fuel tank pressure for a period of time. Fuel tank pressure may be monitored until the pressure reaches a threshold pressure, the threshold pressure indicative of no leaks above a threshold size in the fuel tank. The threshold pressure may be based on the current conditions, including the ambient temperature, fuel level, fuel volatility, etc. In some examples, a rate of pressure change may be compared to an expected rate of pressure change. In some examples, such as when undesired evaporative emissions are present in the fuel system and/or evaporative emissions control system, or where external factors may prevent a pressure rise to the threshold, fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until one or more pressure measurement(s) are less than a previous pressure measurement. In some examples, fuel tank pressure may be monitored until the fuel tank temperature stabilizes. Method 500 may then proceed to 506.

At 506, method 500 may include determining whether the pressure rise test ended due to a passing result, such as the fuel tank pressure reaching a pressure threshold. If the pressure rise test resulted in a passing result, method 500 may proceed to 508. At 508, method 500 may include recording the passing test result. Continuing at 510, method 500 may include opening the canister vent valve. In this way, the fuel system pressure may be returned to atmospheric pressure. If the vehicle system includes a fuel tank isolation valve, the isolation valve may be maintained open while pressure in the fuel system is returned to atmospheric pressure, whereupon reaching atmospheric pressure the fuel tank isolation valve may be commanded closed. Method 500 may then end.

Returning to 506, if the pressure rise test did not result in a pass, method 500 may proceed to 512. At 512, method 500 may include opening the CVV and allowing the system to stabilize. Opening the CVV may allow the fuel system pressure to equilibrate to atmospheric pressure. If included, a fuel tank isolation valve may additionally be maintained open to allow the fuel system and evaporative emission system pressure to equilibrate to atmospheric pressure. The system may be allowed to stabilize until the fuel tank pressure reaches atmospheric pressure, and/or until consecutive pressure readings are within a threshold of each other. Method 500 may then proceed to 514.

At 514, method 500 may include closing the CVV. If included, a fuel tank isolation valve may be maintained open at 514. In this way, the fuel system and evaporative emissions system may be isolated from atmosphere. As the fuel in the fuel tank cools, fuel vapors should condense into liquid fuel, creating a vacuum within the sealed fuel system and evaporative emissions system. Continuing at 516, method 500 may include performing a vacuum test. Performing a vacuum test may include monitoring pressure in the fuel system and evaporative emissions system for a duration. The pressure may be monitored until the vacuum reaches a threshold, the threshold vacuum indicative of no leaks above a threshold size in the fuel system and evaporative emissions system. The threshold vacuum may be based on the current conditions, including the ambient temperature, the fuel level, the fuel volatility, etc. In some examples, the rate of pressure change may be compared to an expected rate of pressure change. The fuel tank pressure may not reach the threshold vacuum. Rather the fuel tank pressure may be monitored for a predetermined duration, or a duration based on the current conditions.

Continuing at 518, method 500 may include determining whether a passing result was indicated for the vacuum test, such as the fuel tank vacuum reaching a pressure threshold. If the vacuum test resulted in a passing result, method 500 may proceed to 508. At 508, method 600 may include recording the passing test result. Continuing at 510, method 500 may include opening the canister vent valve. In this way, the fuel system pressure may be returned to atmospheric pressure. If the vehicle system includes a fuel tank isolation valve, the isolation valve may be maintained open while pressure in the fuel system is returned to atmospheric pressure, whereupon reaching atmospheric pressure the fuel tank isolation valve may be commanded closed. Method 600 may then end.

Returning to 518, if a passing result was not indicated for either the pressure rise test or the vacuum test, method 500 may proceed to 520. At 520, method 600 may include retrieving weather data for the EONV test duration. As discussed above, the vehicle control system (e.g., 14) may be communicatively coupled to an off-board computing system such as a network or cloud computing system via wireless communication, which may be Wi-Fi, Bluetooth, a type of cellular service, or a wireless data transfer protocol. As such, weather information may be retrieved from one or more data servers, including government and/or private data collection services that provide historic and forecast weather data in a retrievable format, for example, via an application programming interface. The weather information retrieved may be based on the location of the vehicle as determined by an on-board GPS. For example, data from the nearest available weather stations may be retrieved. The retrieved data may include temperature, humidity, barometric pressure, precipitation, wind, etc. and may include metadata indicating time, day, year, location, etc. Controller 12 may process the data to extract the relevant data from the EONV test period, and further to export the data to a format where it can be analyzed and compared to data recorded during the EONV test.

Proceeding to 522, method 500 may include determining whether the EONV test results may have been affected by current weather conditions. For example, while entry into the EONV test was based on a heat rejection index being above a threshold at step 410 of method 400, certain weather conditions may prevent heat from the engine at a vehicle-off event from further pressurizing the fuel system and evaporative emissions system, and/or may affect development of a vacuum responsive to the pressure rise test not passing. Such example weather conditions may include snow, heavy wind, rain, etc. As such, at 522, if it is indicated that weather conditions may have negatively affected the EONV test, then method 500 may proceed to 524. At 524, method 500 may include discarding the test results, and may include setting a flag at the controller indicating that an EONV test conducted, but that the results of the test are not valid due to external weather conditions.

Method 500 may thus proceed to 526, and may include commanding open the CVV. As described above, opening the CVV may allow the fuel system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve may be closed responsive to the fuel system and evaporative emissions system reaching atmospheric pressure. However, in other examples the fuel tank isolation valve may be maintained open during vehicle-off conditions.

As the EONV test did not provide conclusive results as a result of weather conditions negatively impacting the test, method 500 may proceed to method 600, depicted in FIG. 6. More specifically, because the EONV test was impacted by local weather conditions such that the results of the test are not conclusive, it may be desirable to conduct another evaporative emissions system test at a later time that is not dependent on heat rejection from the engine, and which may occur at when weather conditions may be less likely to impact the test, as the result of changing weather patterns, etc. Accordingly, method 600, as discussed above and which will be discussed in greater detail below, may be utilized in order to conduct an evaporative emissions test diagnostic procedure based on a change in ambient light amount. The use of such a method may demand the vehicle to be parked for a duration long enough for the vehicle to experience a change in ambient light conditions, and as such, if a vehicle-on event is indicated prior, then the method may be aborted. However, if the vehicle is parked for a duration long enough to experience an ambient light change, then by proceeding with method 600, an evaporative emissions test diagnostic may be completed in some examples wherein the EONV tests were discarded, thus increasing a test completion frequency.

Returning to 522, if the results of the EONV test were not indicated to have been negatively impacted by local weather conditions, then method 500 may proceed to 528. At 528, method 500 may include indicating that the test results are valid, and at 530, method 500 may further include recording the result of the EONV test at the controller, where the results of the EONV test indicate the presence of undesired evaporative emissions in the fuel system/evaporative emissions control system. Proceeding to 532, method 500 may include commanding open the CVV. As discussed above, opening the CVV may allow the fuel system and evaporative emissions system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve, if included, may be closed responsive to the fuel system and evaporative emissions system reaching atmospheric pressure. However, in other examples the fuel tank isolation valve may be maintained open during vehicle-off conditions, as described above.

Proceeding to 534, method 500 may include taking an action responsive to the indicated presence of undesired evaporative emissions in the fuel system/evaporative emissions control system. In one example, taking an action may include illuminating a malfunction indicator light (MIL) on a vehicle dashboard in order to alert a vehicle operator of the desire to service the vehicle. In another example, taking an action may additionally include updating a canister purge schedule based on the indication of undesired evaporative emissions. For example, canister purge operations may be scheduled to be conducted more frequently, such that vapors in the fuel system and/or evaporative emissions system may be purged to engine intake for combustion, rather than being released to atmosphere. Method 500 may then end.

Turning now to FIG. 6, a flow chart for a high-level example method 600 for conducting an evaporative emissions test diagnostic based on sunrise and sunset data gather via the internet, a nearby vehicle, and/or a solar cell, is shown. More specifically, method 600 may continue from method 400 depicted in FIG. 4, or from method 500 depicted in FIG. 5, and may include conducting an evaporative emissions test diagnostic responsive to a predicted sunrise or sunset event. In one example, it may be determined that a heat rejection index is below a threshold, and thus an EONV test may not be conducted at a vehicle-off event. Instead, method 600 may be used in order to conduct an evaporative emissions test diagnostic responsive to retrieved sunrise and sunset times. In another example, an EONV test may be conducted, yet results of the test may be discarded due to indicated weather events affecting the outcome of the EONV test. Thus, method 600 may be used in order to conduct another evaporative emissions test during the vehicle-off condition, responsive to the vehicle being maintained off for sufficient duration to cool off and reach an ambient temperature during one or more of the sunrise and the sunset. Method 600 will be described with reference to the systems described and shown in FIGS. 1 and 2, though it should be understood that similar methods may be applied to other systems without departing from the scope of this disclosure.

Method 600 begins at 602 and may include maintaining the canister vent valve (CVV) open. Step 602 may be carried out by the controller (e.g., 12). Proceeding to 604, method 600 may include indicating whether a sunrise or sunset event is detected. In other words, at step 604, it may be indicated whether a change in ambient light amount is detected and/or if sunrise and sunset times were retrieved from a nearby vehicle or from the internet. Detecting the sunrise and sunset event is described in greater detail in method 700 of FIG. 7. In one example, method 700 is a sub-method of 600.

If, at 604, a sunrise and/or sunset event is not detected, then method 600 may proceed to 606, and may include indicating whether a vehicle-on event has occurred. For example, a vehicle-on event may include a key-on event, a remote-start event, etc. If, at 606, a vehicle-on event is indicated, method 600 may proceed to 608, wherein method 600 may be aborted. While method 600 illustrates that a vehicle-on event may be sufficient to abort method 600 at step 608, it may be understood that, while not explicitly illustrated, a vehicle-on event detected at any point during method 600 may be sufficient to abort the method. If a vehicle-on event is not detected, method 600 may return to 602 and may include maintaining open the CVV.

If, at 604, a sunrise or sunset is predicted (as indicated by a change in ambient light amount and/or via sunrise and sunset data gathered from the internet), method 600 may proceed to 610. At 610, method 600 may include waking the controller.

Proceeding to 612, method 600 may include determining if a fuel tank pressure will change within a threshold duration. That is to say, it may be determined where present fuel tank conditions will allow the fuel tank to reach the predetermined threshold pressure within the threshold duration. Conditions which may affect a rate of the fuel tank pressure change may include one or more of weather, a fuel tank volume, and vehicle location. For example, if a vehicle comprises a volume of fuel greater than a threshold fuel volume, then the fuel tank pressure may not change within the threshold duration. This may occur for a semi-truck or other large vehicle comprising a large fuel tank shaped to contain relatively high amount of fuel (e.g., 500 liters). However, if a vehicle comprises a volume of fuel less not greater than the threshold fuel volume, then its fuel tank pressure may change within the threshold duration. This may occur for a car, such as a sedan, comprising a fuel tank shaped to contain a relatively small amount of fuel (e.g., 60 liters). If the fuel tank pressure is expected to change within the threshold duration, then the method 600 may proceed to 614 to maintain the controller ON or in a wake condition. However, if the fuel tank pressure is not expected to change within the threshold duration, then the method 600 may proceed to 616 to alternate the controller between ON (wake) and OFF (sleep) conditions. By alternating the controller between ON and OFF, parasitic losses (e.g., excess energy consumption) may be reduced for vehicles comprising a volume of fuel greater than a threshold volume of fuel or for vehicles in extreme weather conditions (e.g., extreme cold or extreme heat).

In some examples, vehicles with similar fuel tank volumes and/or fuel level magnitudes may compare leak detection times. Said another way, vehicles with similar fuel volumes in similar-sized fuel tanks may compare a duration of time needed to increase the fuel tank pressure to the predetermined threshold pressure. Additionally or alternatively, an average time needed for the fuel tank pressure to increase to the predetermined threshold pressure may be calculated. If a vehicle of a group of vehicles needs an amount of time greater than the average time, then it may be determined that a leak is present. This comparison of times may occur in conjunction with an internal vehicle standard. That is to say, an individual vehicle may comprise its own threshold duration to which the time needed to increase the fuel tank pressure to the predetermined threshold pressure is compared. However, the time needed to increase the fuel tank pressure may also be compared to the average time needed based on information gathered from a plurality of nearby vehicles comprising similar amounts of fuel in their fuel tanks. Thus, to maintain fidelity, grouped vehicles may be in similar climates, altitudes, and may receive similar amounts of light.

In some examples, additionally or alternatively, a difference in a duration of time needed to increase the fuel tank pressure to the predetermined threshold pressure may occur between to fuel vehicles having similar fuel tank volumes but with different amount of fuel in their respective fuel tanks. For example, a first vehicle and a second vehicle may have equally sized fuel tanks, but the first vehicle fuel tank may comprise 20 liters of fuel and the second vehicle fuel tank may comprise two liters of fuel. In this way, time constants associated with the fuel in the first and second vehicles may different by greater than a threshold amount, wherein the time constants are based on an estimated amount of time needed to heat the fuel to a predetermined threshold pressure. Thus, thermal masses of the first and second vehicles may be sufficiently different that results of the pressure change during the leak test are not compared.

In some examples, a fuel tank volume may refer to a volume of fuel in the fuel tank. In other examples, a fuel tank volume may refer to a total volume of a fuel tank, wherein the total volume may contain fuel and gases. At any rate, vehicles with fuels tanks having a similar thermal mass (e.g., a mass of contents that will be heated during the sunrise or cooled during the sunset) may be compared during the diagnostic. For example, a first vehicle may have a 100-liter fuel tank comprising 10 liters of fuel and a second vehicle may have a 500-liter fuel tank comprising 10 liters of fuel. In such an example, the first and second vehicles may not be compared despite having similar volumes of fuel in their respective tanks. This may be due to the total volume of the fuel tank of the second vehicle being greater than a threshold difference (e.g., 15%) of the total volume of the fuel tank of the first vehicle. In some examples, additionally or alternatively, the first and second vehicles may be compared during the diagnostic.

Method 600 may proceed to 618 following 614 or 616. At 618, method 600 may include commanding closed the CVV. By commanding closed the CVV, the vehicle fuel system and evaporative emissions control system may be isolated from atmosphere (e.g., sealed). While not explicitly illustrated in method 600, it may be understood that a canister purge valve (CPV) (e.g., 112) may be maintained in a closed conformation, thus additionally isolating the fuel system and evaporative emissions control system from engine intake. Furthermore, while not explicitly illustrated, if a fuel tank isolation valve (FTIV) (e.g., 110) is included in the vehicle, the FTIV may be commanded open prior to commanding closed the CVV. By commanding open the FTIV the vehicle fuel system may be coupled to the evaporative emissions control system, such that an evaporative emissions test diagnostic may be conducted on both the fuel system and the evaporative emissions system concurrently.

Proceeding to 620, with the fuel system and evaporative emissions control system isolated from atmosphere and from engine intake, pressure may be monitored. In one example, pressure may be monitored by a fuel tank pressure transducer (e.g., 120), as described above with regard to FIG. 1. Depending on whether a sunrise or sunset event is occurring, pressure in the fuel system and evaporative emissions system may be monitored for a pressure build, or a vacuum build, respectively. As discussed above with regard to FIG. 3 a sunrise event (e.g., 304) marks a time of day near where a heat gain cycle is at its greatest, and thus pressure in the sealed fuel system and evaporative emissions control system may be monitored for a positive pressure build. Alternatively, a sunset event (e.g., 306) marks a time of day near where a heat loss cycle is at its greatest, and thus pressure in the sealed fuel system and evaporative emissions control system may be monitored for a negative pressure (e.g., vacuum) build.

As such, responsive to a sunrise event, pressure in the fuel tank may rise due to fuel volatizing with increased temperature. A pressure rise test may include monitoring fuel tank pressure for a period of time. Fuel tank pressure may be monitored until the pressure reaches a threshold, the threshold pressure indicative of no leaks above a threshold size in the fuel tank. The threshold pressure may be based on the current conditions, including the ambient temperature, fuel level, fuel volatility, etc. In some examples, a rate of pressure change may be compared to an expected rate of pressure change. In some examples, such as when undesired evaporative emissions are present in the fuel system and/or evaporative emissions control system, or where external factors may prevent a pressure rise to the threshold, fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until one or more pressure measurement(s) are less than a previous pressure measurement. In some examples, fuel tank pressure may be monitored until the fuel tank temperature stabilizes.

Alternatively, responsive to a sunset event, pressure in the fuel tank may decrease due to fuel vapor condensing with decreased temperature. As such, a vacuum-build test may include monitoring pressure in the fuel system and evaporative emissions system for a duration. The pressure may be monitored until the vacuum reaches a threshold, the threshold vacuum indicative of no leaks above a threshold size in the fuel system and evaporative emissions system. The threshold vacuum may be based on the current conditions, including the ambient temperature, the fuel level, the fuel volatility, etc. In some examples, the rate of pressure change may be compared to an expected rate of pressure change. In some examples, such as when undesired evaporative emissions are present in the fuel system and/or evaporative emissions control system, or where external factors may prevent a vacuum build to the threshold, pressure in the fuel system and evaporative emissions system may not reach the threshold vacuum. Rather the pressure may be monitored for a predetermined amount of time, or an amount of time based on the current conditions. Pressure in the fuel system and evaporative emissions system may be monitored until consecutive measurements are within a threshold amount of each other, or until one or more pressure measurement(s) are greater than a previous pressure measurement. In some examples, pressure in the fuel system and evaporative emissions system may be monitored until the fuel tank temperature stabilizes.

Accordingly, at 620, method 600 includes indicating whether a pressure build or a vacuum build in the fuel system and evaporative emissions system has reached either a pressure build threshold or a vacuum build threshold. Responsive to an indication that either the pressure build threshold or the vacuum build threshold has been reached at 620, method 600 may proceed to 622. At 622, method 600 may include recording the passing test result at the controller. Continuing at 624, method 600 may include commanding open the canister vent valve. In this way, pressure in the fuel system and evaporative emissions system may be returned to atmospheric pressure. If the vehicle fuel system includes a fuel tank isolation valve, the isolation valve may be maintained open while pressure in the fuel system is returned to atmospheric pressure, whereupon reaching atmospheric pressure the fuel tank isolation valve may be commanded closed.

Proceeding to step 626, method 600 may include sleeping the controller. By sleeping the controller while the vehicle is off, and only waking the controller in order to conduct the evaporative emissions test diagnostic, battery supply may be conserved. Method 600 may then end.

Returning to 620, if it is indicated that either pressure build or vacuum build in the fuel system and evaporative emissions system did not reach the pressure-build threshold, or vacuum-build threshold, respectively, method 620 may proceed to 628. At 628, method 600 may include recording the results of the test at the controller, where the results indicate the presence of undesired evaporative emissions in the fuel system and evaporative emissions control system. Proceeding to 630, method 600 may include commanding open the CVV. As discussed above, opening the CVV may allow the fuel system and evaporative emissions system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve, if included, may be closed responsive to the fuel system and evaporative emissions system reaching atmospheric pressure. However, in other examples the fuel tank isolation valve may be maintained open during vehicle-off conditions, as described above.

Proceeding to 632, method 600 may include taking an action responsive to the indicated presence of undesired evaporative emissions in the fuel system/evaporative emissions control system. In one example, taking an action may include illuminating a malfunction indicator light (MIL) on a vehicle dashboard in order to alert a vehicle operator of the desire to service the vehicle. In another example, taking an action may additionally include updating a canister purge schedule based on the indication of undesired evaporative emissions. For example, canister purge operations may be scheduled to be conducted more frequently, such that vapors in the fuel system and/or evaporative emissions system may be purged to engine intake for combustion, rather than being released to atmosphere.

Continuing to 634, method 600 may include sleeping the controller. As discussed above, by sleeping the controller while the vehicle is off, and only waking the controller in order to conduct the evaporative emissions test diagnostic, battery supply may be conserved. Method 600 may then end.

Turning now to FIG. 7, it shows a method 700 for gathering sunset and sunrise times via Wi-Fi or wireless communications with another vehicle. As described above, method 700 may be executed in tandem with method 600 of FIG. 6. More specifically, prior to executing the pressure test during method 600, the method 700 may be executed during the method 600 to determine an optimal time for executing the pressure test, wherein the optimal time may comprise a greatest ambient temperature change, which may correspond with a sunrise or a sunset.

The method 700 begins at 702, which includes determining if a wireless modem is onboard at least one vehicle. In one example, the at least one vehicle is a vehicle of a plurality of vehicles. In one embodiment, the at least one vehicle may be identical to each of the vehicles of the plurality of vehicles. In other embodiments, the at least one vehicle may be different than some or all of the vehicles of the plurality of vehicles. If the at least one vehicle comprises a wireless modem, then the method 700 may proceed to 704, which may include determining if Wi-Fi is available. Wi-Fi may be available if the modem may communicate with a server or other internet device (such as an internet device of another vehicle, business, or the like), such that a controller of the at least one vehicle may access information the internet.

If Wi-Fi is available, then the method 700 may proceed to 706, which may include the at least one vehicle retrieving sunrise and sunset times. More specifically, the at least one vehicle may retrieve times at which the sunrise and sunset may begin, in some examples. The sunrise and sunset times may be based on historical data and/or a model predicting sunrise and sunset times daily.

The method 700 may proceed to 708, which may include relaying the information regarding the sunrise and sunset times to other vehicles. In some examples, the relaying may be over the internet (V2X), wherein the other vehicles may be located inside or outside of a first threshold distance (e.g., 1000 ft.). In some examples, relaying the information may be limited to a second threshold distance, wherein the second threshold distance is based on sunrise times. In one example, if a first vehicle is more than the second threshold distance away from a second vehicle and each of the first and second vehicles determine different sunrise and sunset times, then the two vehicles may not provide contradictory information to one another. In other examples, the relaying may be over a DSRC network (e.g., V2V), wherein the other vehicles may be located within the first threshold distance.

Returning to 702 and/or 704, if a wireless modem is not onboard the vehicle or if a Wi-Fi connection is not available to a vehicle with a wireless modem onboard, then the method 700 may proceed to 710 to monitor ambient light via a solar cell. The solar cell may be coupled to an outer portion of the vehicle (e.g., a top of the vehicle body), wherein the solar cell may be configured to monitor ambient light, thereby determining a beginning of a sunrise or sunset.

The method 700 may proceed to 712, which may include relaying the sunrise and sunset times to vehicles without solar cells. Additionally or alternatively, the at least one vehicle may relay the sunrise and sunset times to other vehicles within the first threshold. Thus, the relaying may occur over the DSRC network without Wi-Fi. The method 700 may return to 604 following either 708 or 712, where the EONV test may continue to be executed.

In one example, a plurality of vehicles may be manufactured, wherein at least one of vehicles comprises a wireless modem and a solar cell coupled thereto. However, each of the vehicles may be configured to communicate over the DSRC network. As such, the at least one vehicle may determine sunrise and sunset times via the wireless modem when Wi-Fi is available or via the solar cell when Wi-Fi is not available. The at least one vehicle may then share the sunrise and sunset times with the other vehicles of the plurality of vehicles so that each of the plurality of vehicles may execute the EONV test during a subsequent sunrise or sunset. As an example, if a subsequent sunrise or sunset does not provide a vehicle a sufficient amount of time to cool off to ambient temperatures, then the vehicle may not perform the EONV diagnostic until a later sunrise or sunset. As one example, if a vehicle shut-off 20 minutes prior to a sunrise, the vehicle may determine that 20 minutes may be insufficient for it to cool down to ambient temperatures and the EONV test may be executed at the subsequent sunset.

In some examples, each of the plurality of vehicles is identical in make and model. In other examples, each of the plurality of vehicles may be different in one or more of make and model. In one example, the plurality of vehicles may comprise of one or more of cars, trucks, sport utility vehicles (SUV), police cars, semi-trucks, ambulances, fire trucks, mail trucks, and other vehicles. The plurality of vehicles may be spark-ignited, compression ignition, and/or electric. Additionally or alternatively, the plurality of vehicles may be autonomous, semi-autonomous, and/or hybrid.

Turning now to FIG. 8, it shows an operating sequence 800 for a first vehicle and a second vehicle, which may be included in a plurality of vehicles where at least one of the vehicles comprises one or more of the wireless modem and the solar cell. Plot 810 illustrates if a sunrise is occurring, plot 820 illustrates a first vehicle fuel volume and dashed line 822 illustrates a threshold fuel volume, plot 830 illustrates a first vehicle fuel pressure and dashed line 832 illustrates a threshold fuel pressure, plot 840 illustrates a first vehicle controller condition, plot 850 illustrates a second vehicle fuel volume and dashed line 852 illustrates the threshold fuel volume which may be equal to dashed line 822, plot 860 illustrates a second vehicle fuel pressure and dashed line 862 illustrates a threshold fuel pressure, and plot 870 illustrates a second vehicle controller condition. Time is indicated on the horizontal axis of plot 800 and increases from a left to right side of the FIG. 8.

Prior to t1, the sunrise is not occurring (plot 810) such that the sun may not be visible over a horizon of the earth. Additionally or alternatively, this may correspond to an amount of ambient light being less than a threshold amount of ambient light, as described above. As such, the first vehicle fuel pressure and the second vehicle fuel pressure (plots 830 and 860, respectively) may be less than their corresponding threshold fuel pressures (dashed lines 830 and 860, respectively). The threshold fuel pressures may be unequal and as such dashed line 832 may herein be referred to as the first vehicle threshold fuel pressure and dashed line 862 may be referred to as the second vehicle threshold fuel pressure. The threshold fuel pressures may be different due to the first vehicle fuel volume being unequal to the second vehicle fuel volume (plots 820 and 850, respectively). More specifically, the first vehicle fuel volume is less than the threshold fuel volume and the second vehicle fuel volume is greater than the threshold fuel volume. In one example, the threshold fuel volume is based on a volume of fuel which may increase from an initial pressure to a pressure greater than or equal to a threshold fuel pressure within a threshold duration of time (e.g., less than five minutes). Thus, if a volume of fuel is greater than the threshold volume (e.g., the second vehicle fuel volume, then the fuel pressure may not exceed the threshold fuel pressure within the threshold duration. In this way, a controller operation may be adjusted based on the fuel volume as will be described below.

At t1, the sunrise begins to occur, and the first vehicle controller (plot 840) and the second vehicle controller (plot 870) are both switched to wake. At the beginning of the sunrise, the sun may be visible over a horizon of the earth. An amount of the sun which is visible over the horizon may be less than a threshold. In one example, the threshold is less than 5% of the sun. As such, a relatively small portion of the sun is visible over the horizon. Thus, the first and second vehicles, which may be included in a plurality of vehicles, may at least somewhat simultaneously begin an EONV test. Between t1 and t2, the first vehicle fuel pressure and the second vehicle fuel pressures begin to rise toward the first and second vehicle threshold fuel pressures, respectively. However, the first vehicle fuel pressure increases at a higher rate than the second vehicle fuel pressure due to the first vehicle fuel volume being less than the second vehicle fuel volume. Thus, the fuel in the first vehicle may get hotter more quickly than the fuel in the second vehicle. Since the first vehicle fuel pressure may quickly surpass the first vehicle threshold fuel pressure within the threshold duration, the first vehicle controller may remain awake for the entire EONV test. However, since the second vehicle fuel pressure may slowly increase and may not surpass the second vehicle threshold fuel pressure within the threshold duration, the second vehicle controller may be oscillated between awake and sleep conditions. By doing this, a battery SOC may be preserved in vehicles comprising greater than the threshold fuel volume.

At t2, the first vehicle fuel pressure increases to a fuel pressure greater than the first vehicle threshold fuel pressure. As such, the first vehicle may not comprise a leak. The first vehicle controller may switch from awake to sleep. The second vehicle fuel pressure continues to increase toward the second vehicle threshold fuel pressure. The second vehicle controller continues to alternate between awake and sleep conditions.

Between t2 and t3, the second vehicle fuel pressure continues to increase and increases to a fuel pressure greater than the second vehicle threshold fuel pressure slightly before t3. However, the second vehicle controller is asleep when this occurs and may not sense the fuel pressure increase until a later time.

Between t3 and t4, the second vehicle controller is switched from sleep to wake and receives feedback regarding the second vehicle fuel pressure being greater than the second vehicle threshold fuel pressure. In response, the second vehicle controller may be switched and maintained in sleep and the EONV test is passed for both the first and second vehicles. At t4, the sunrise is complete. When the sunrise is complete, the sun may be completely visible in the sky. As such, disregarding clouds and other weather conditions which may obstruct a view of the sun, the sun may be 100% visible.

In this way, at least one vehicle of a plurality of vehicles may comprise one or more devices, including a wireless modem and/or a solar cell, for determining sunrise and sunset times. The at least one vehicle may share the sunrise and sunset times with remaining vehicles in the plurality of vehicles such that each vehicle of the plurality of vehicles may conduct an emissions test during a subsequent sunrise or sunset. The technical effect of allowing the plurality of vehicles to share sunrise and sunset times is to ensure that the vehicles perform the emissions test according to government standards. Additionally, manufacturing costs may be reduced by equipping only some of the plurality of vehicles with the wireless modem and the solar cell.

An embodiment of a method comprising alternating a controller between wake and sleep during an emission test in response to a fuel tank volume during a sunrise or a sunset. A first example of the method further includes where a vehicle comprising the controller is off. A second example of the method, optionally including the first example, further includes where alternating the controller between wake and sleep includes a threshold duration of time elapsing between wake and sleep, and where the controller is maintained awake in response to a volume of fuel in the fuel tank being less than a threshold volume and an engine temperature being equal to an ambient temperature. A third example of the method, optionally including the first and/or second examples, further includes where gather times for the sunrise and the sunset via Wi-Fi or via communication with a vehicle within a threshold proximity. A fourth example of the method, optionally including one or more of the first through third examples, further includes where the threshold proximity is 5000 feet. A fifth example of the method, optionally including one or more of the first through fourth examples, further includes where executing an engine-off natural diagnostic during the sunrise or the sunset.

An embodiment of a system comprising a plurality of vehicles each comprising a dedicated-short-range-communication network, wherein at least one vehicle of the vehicle comprises one or more of a wireless modem and a solar cell, a controller with computer-readable instructions stored on non-transitory memory thereof that when executed enable the controller to retrieve times for a sunrise and a sunset for the at least one vehicle, relay times from the at least one vehicle to other vehicles of the plurality of vehicles, and execute an emission test during the sunrise or the sunset. A first example of the system further includes where the controller is further enabled to determine a volume of fuel in the fuel tank, and where. A second example of the system, optionally including the first example, further includes where the controller is oscillated between sleep and wake in response to the volume of fuel being greater than a threshold volume, and where the controller is maintained awake in response to the volume of fuel not being greater than the threshold volume. A third example of the system, optionally including the first and/or second examples, further includes where the emission test is executed simultaneously for a group of vehicles of the plurality of vehicles comprising less than a threshold volume of fuel in a fuel tank. A fourth example of the system, optionally including one or more of the first through third examples, further includes where each vehicle of the plurality of vehicles comprises the wireless modem. A fifth example of the system, optionally including one or more of the first through fourth examples, further includes where the at least one vehicle is the only vehicle of the plurality of vehicle comprising one or more of the solar cell and the wireless modem. A sixth example of the system, optionally including one or more of the first through fifth examples, further includes where the at least one vehicle retrieves times for the sunrise and the sunset when a wireless connection is available. A seventh example of the system, optionally including one or more of the first through sixth examples, further includes where the at least one vehicle detects an ambient light amount via the solar cell in the absence of a wireless connection. An eighth example of the system, optionally including one or more of the first through seventh examples, further includes where the at least one vehicle comprises only the wireless modem and a different vehicle of the plurality of vehicles comprises the solar cell.

An embodiment of a method comprising wirelessly retrieving information related to timepoints in a diurnal cycle where an ambient temperature is maximally rising and maximally dropping and wirelessly sending a request from a vehicle to one or more other vehicles located within a threshold distance of the vehicle to schedule an evaporative emissions system diagnostic at one or more of the timepoints. A first example of the method further includes where the vehicle and the one or more vehicles are off during the evaporative emissions test, and where the timepoints correspond to a sunrise and a sunset. A second example of the method, optionally including the first example, further includes where the vehicle and the one or more vehicles each determine a fuel tank volume, and where operation of a controller is maintained awake if the fuel tank volume is less than a threshold fuel tank volume, and where operation of the controller is alternated between awake and asleep if the fuel tank volume is not less than the threshold fuel tank volume. A third example of the method, optionally including the first and/or second examples, further includes where the evaporative emissions system diagnostic is scheduled for a next timepoint of the one or more timepoints if a vehicle temperature is equal to an ambient temperature. A fourth examples of the method, optionally including one or more of the first through third examples, further includes where the evaporative emissions system diagnostic is scheduled for a later timepoint, subsequent the next timepoint, if the vehicle temperature is greater than the ambient temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
alternating a controller between wake and sleep to start and stop an emission test in response to a fuel tank volume during a sunrise or a sunset; and
providing sunrise and sunset times via a vehicle of a plurality of vehicles, wherein each vehicle of the plurality of vehicles comprises a dedicated-short-range communication network, and wherein the vehicle is the only vehicle of the plurality of vehicles comprising one or more of a wireless modem and a solar cell.

2. The method of claim 1, further comprising where an engine of the vehicle is off during the emission test.

3. The method of claim 1, wherein alternating the controller between wake and sleep includes a threshold duration of time elapsing between wake and sleep, and wherein the controller is maintained awake in response to the fuel tank volume being less than a threshold volume and an engine temperature being equal to an ambient temperature.

4. The method of claim 1, further comprising gathering times for the sunrise and the sunset via Wi-Fi or via communication with the vehicle within a threshold proximity.

5. The method of claim 4, wherein the threshold proximity is 5000 feet.

6. The method of claim 1, further comprising executing an engine-off natural diagnostic during the sunrise or the sunset.

7. A system comprising:
a plurality of vehicles each comprising a dedicated-short-range-communication network, wherein at least one vehicle of the plurality of vehicles is the only vehicle comprising a wireless modem and a different vehicle comprises a solar cell;
a controller with computer-readable instructions stored on non-transitory memory thereof that, when executed, enable the controller to:
retrieve times for a sunrise and a sunset for the at least one vehicle;
relay times from the at least one vehicle to other vehicles of the plurality of vehicles; and
execute an emission test during the sunrise or the sunset.

8. The system of claim 7, wherein the controller is further enabled to determine a volume of fuel in a fuel tank.

9. The system of claim 8, wherein the controller is oscillated between sleep and wake in response to the volume of fuel being greater than a threshold volume, and wherein the controller is maintained awake in response to the volume of fuel not being greater than the threshold volume.

10. The system of claim 9, wherein the emission test is executed simultaneously for a group of vehicles of the plurality of vehicles comprising less than a threshold volume of fuel in a fuel tank.

11. The system of claim 7, wherein each vehicle of the plurality of vehicles comprises the wireless modem.

12. The system of claim 7, wherein the at least one vehicle retrieves times for the sunrise and the sunset when a wireless connection is available.

13. The system of claim 7, wherein the different vehicle detects an ambient light amount via the solar cell in the absence of a wireless connection.

14. A method comprising:
wirelessly retrieving information related to timepoints in a diurnal cycle where an ambient temperature is maximally rising and maximally dropping via a wireless modem in a vehicle; and
wirelessly sending a request from the vehicle to one or more other vehicles located within a threshold distance of the vehicle to schedule an evaporative emissions system diagnostic at one or more of the timepoints via a dedicated-short-range-communication network.

15. The method of claim 14, wherein the vehicle and the one or more vehicles are off during the evaporative emissions system diagnostic, wherein the timepoints correspond to a sunrise and a sunset, and wherein the vehicle comprises a solar cell configured to detect an ambient light amount in an absence of a wireless connection.

16. The method of claim 14, wherein the vehicle and the one or more vehicles each determine a fuel tank volume, wherein operation of a controller is maintained awake if the fuel tank volume is less than a threshold fuel tank volume, and wherein operation of the controller is alternated between awake and asleep if the fuel tank volume is not less than the threshold fuel tank volume.

17. The method of claim 14, wherein the evaporative emissions system diagnostic is scheduled for a next timepoint of the one or more timepoints if a vehicle temperature is equal to an ambient temperature.

18. The method of claim 17, wherein the evaporative emissions system diagnostic is scheduled for a later timepoint, after the next timepoint, if the vehicle temperature is greater than the ambient temperature.

* * * * *